L. DANIELS.
COFFEE STRAINER.
APPLICATION FILED AUG. 6, 1918.
1,291,429.
Patented Jan. 14, 1919.
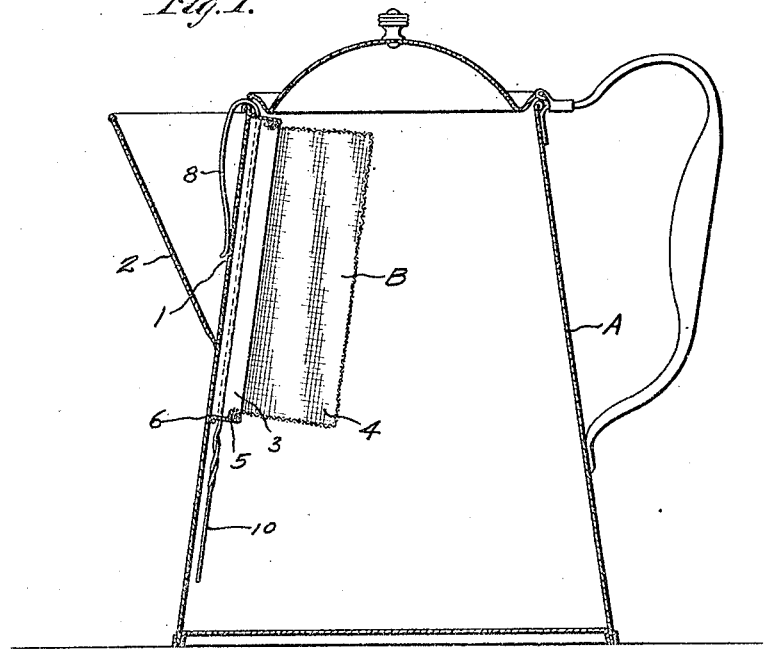
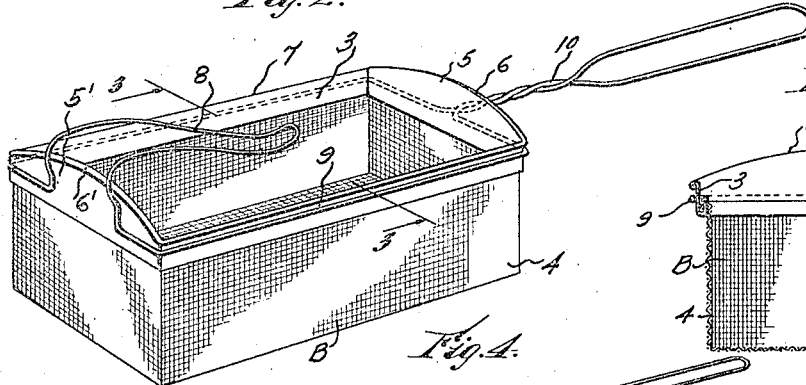
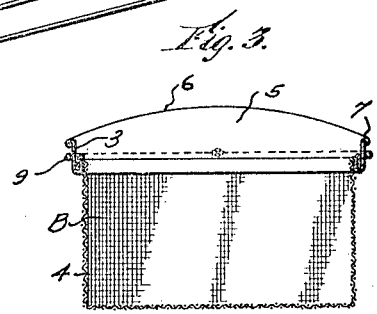
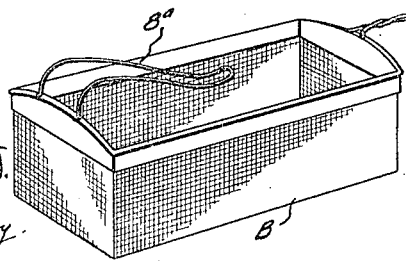
WITNESSES
INVENTOR
Louis Daniels,
BY
ATTORNEYS

UNITED STATES PATENT OFFICE.

LOUIS DANIELS, OF NEW YORK, N. Y.

COFFEE-STRAINER.

1,291,429.   Specification of Letters Patent.   Patented Jan. 14, 1919.

Application filed August 6, 1918. Serial No. 248,620.

*To all whom it may concern:*

Be it known that I, LOUIS DANIELS, a citizen of the United States, and a resident of the city of New York, borough of Manhattan, in the county and State of New York, have invented a new and Improved Coffee-Strainer, of which the following is a full, clear, and exact description.

This invention relates to a construction adapted to be used in tea or coffee pots, and the invention has for its general objects to provide an improved construction which can be attached within the pot at the spout so as to strain the beverage in the pot as the same is poured; or the strainer can be held in one hand by its handle and the beverage poured through the strainer in the usual manner. For this purpose the strainer has a frame of special shape, whereby it conforms to the curvature of the body of the pot, so that all the liquid in pouring out must pass through the strainer while the solid matter is arrested.

With such and other objects in view, the invention comprises various novel features of construction and arrangement of parts which will be set forth with particularity in the following description and claims appended hereto.

In the accompanying drawing, which illustrates certain embodiments of the invention and wherein similar characters of reference indicate corresponding parts in all the views, Figure 1 is a vertical section of a coffee pot with the strainer in position thereon;

Fig. 2 is a perspective view of the strainer detached from the pot;

Fig. 3 is a transverse section on the line 3—3, Fig. 2; and

Fig. 4 is a modified form of strainer drawn on a reduced scale.

Referring to the drawing, A designates a coffee or tea pot of the ordinary frusto-conical or tapered type, and disposed within the same is the strainer B which is applied over the apertures 1 through which the beverage passes into and through the pouring spout 2.

The strainer B comprises a frame 3 to which is attached a wire mesh box-like strainer body 4. The frame 3 is preferably substantially rectangular and the ends or heads 5 and 5' are curved along the edges 6 and 6' respectively on the same radii as those parts of the body of the coffee pot as are adjacent thereto, and the straight parallel edges 7 have contact with the body of the coffee pot all the way between the heads, so that it is impossible for the grounds or sediment to pass into the spout 2 without passing through the strainer.

The strainer is provided with a spring clip or hook 8 which serves as a hanger for supporting the strainer in position by the said hook engaging over the top or brim of the pot at the spout. This hook may be under spring tension so as to insure the edges 6 and 7 being kept firmly against the inner surface of the pot A. This hook extends inward from the end 6' toward the center of the strainer and may be an integral part of the frame, as shown in Fig. 4, or it may be a part of a wire frame 9 which includes a handle 10 projecting outward from the strainer body opposite from the hook 8. The handle enables the strainer to be used like any ordinary strainer by being held under the spout and over the cup or receptacle into which the strained liquid is poured. It will thus be seen that the construction can be used in two ways, and when it is employed inside the pot the handle extends downward, as shown in Fig. 1, where it is out of the way.

In Fig. 4 the hook 8ª and handle 10ª are suitably fastened to the ends of the strainer and are fixed parts thereof.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claim.

Having thus described my invention, I claim as new and desire to secure by Letters Patent:

The herein described coffee strainer comprising an open frame, a hollow reticulated strainer body attached to the frame and serving either as an internal strainer for a coffee pot or as a cup strainer, and holding means for the device comprising a spring hook carried by one end of the frame and adapted to extend therefrom over the rim of the coffee pot and thence downward and inward toward the center of the strainer body, and a handle carried by the opposite end of the device and extending in a direction away from the body.

LOUIS DANIELS.

Copies of this patent may be obtained for five cents each, by addressing the "Commissioner of Patents, Washington, D. C."